United States Patent
Barwig et al.

(10) Patent No.: US 9,683,786 B2
(45) Date of Patent: Jun. 20, 2017

(54) HEAT EXCHANGER (71) Applicant: MAHLE International GmbH, Stuttgart (DE)

(72) Inventors: Juergen Barwig, Stuttgart (DE); Steffen Ensminger, Notzingen (DE); Ulrich Maucher, Korntal-Muenchingen (DE); Matthias Schmid, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 97 days.

(21) Appl. No.: 14/659,816

(22) Filed: Mar. 17, 2015

(65) Prior Publication Data
US 2015/0184946 A1 Jul. 2, 2015

(30) Foreign Application Priority Data

Sep. 17, 2012 (DE) .................. 10 2012 216 589

(51) Int. Cl.
*F28D 9/00* (2006.01)
*F02M 25/07* (2006.01)
(Continued)

(52) U.S. Cl.
CPC .......... *F28D 9/0062* (2013.01); *F02B 29/045* (2013.01); *F02B 29/0462* (2013.01);
(Continued)

(58) Field of Classification Search
CPC ...... F28D 9/005; F28D 9/0037; F28D 9/0043; F28D 9/0056; F28D 21/0003;
(Continued)

(56) References Cited

U.S. PATENT DOCUMENTS 5,237,604 A * 8/1993 Ryan .................... H04Q 3/0029
379/219
6,920,918 B2 7/2005 Knecht et al.
(Continued)

FOREIGN PATENT DOCUMENTS

CN 1751217 A 3/2006
CN 101268329 A 9/2008
(Continued)

OTHER PUBLICATIONS

Chineses Office Action for Chinese Application No. 201380048219.2 dated May 26, 2016 with English translation.
(Continued)

*Primary Examiner* — Stephen K Cronin
*Assistant Examiner* — Long T Tran
(74) *Attorney, Agent, or Firm* — Muncy, Geissler, Olds & Lowe, P.C.

(57) ABSTRACT

A heat exchanger, in particular an exhaust gas cooler or charge air cooler, is provided that includes a plate stack which has a plurality of elongated plate pairs, each set of two interconnected plates forming a respective second fluid channel between themselves, and a first fluid channel being formed between two plate pairs, a first fluid channel being surrounded by two second fluid channels, each second fluid channel being connected to at least one manifold.

23 Claims, 8 Drawing Sheets

(51) Int. Cl.
*F02B 29/04* (2006.01)
*F28D 21/00* (2006.01)
*F28F 3/02* (2006.01)
*F28F 3/04* (2006.01)
*F28F 9/02* (2006.01)
*F02M 26/29* (2016.01)
*F02M 26/32* (2016.01)

(52) U.S. Cl.
CPC ............ *F02M 26/29* (2016.02); *F02M 26/32* (2016.02); *F28D 9/0037* (2013.01); *F28D 21/0003* (2013.01); *F28F 3/025* (2013.01); *F28F 3/046* (2013.01); *F28F 9/02* (2013.01); *F28F 9/0243* (2013.01); *F28D 2021/0082* (2013.01); *F28F 2009/0297* (2013.01); *F28F 2275/04* (2013.01); *Y02T 10/146* (2013.01)

(58) Field of Classification Search
CPC ........ F28D 9/0031; F28D 9/00; F28D 9/0006; F28D 1/0246; F28D 1/0333; F28D 1/0341; F28F 3/00; F02M 26/32; F02M 26/29; F02M 35/10268
USPC ....... 123/568.12; 165/82, 83, 58, 66, 76, 77, 165/78, 172, 174, 175, 164–167
See application file for complete search history.

(56) References Cited

U.S. PATENT DOCUMENTS

| | | | | |
|---|---|---|---|---|
| 7,237,604 B2* | 7/2007 | Emrich | ................. | F28D 9/0043 165/158 |
| 7,426,957 B2* | 9/2008 | Hendrix | ................. | F28D 9/005 165/166 |
| 7,600,559 B2* | 10/2009 | Strahle | ................. | F28D 9/0012 165/167 |
| 7,637,112 B2* | 12/2009 | Vanden Bussche | ... | F25J 1/0022 165/167 |
| 8,020,610 B2 | 9/2011 | Soldner et al. | | |
| 8,596,339 B2* | 12/2013 | Palanchon | ............ | F28D 9/0031 165/103 |
| 2004/0159424 A1 | 8/2004 | Reinke et al. | | |
| 2007/0023174 A1 | 2/2007 | Brost | | |
| 2007/0062671 A1* | 3/2007 | Sugimoto | ............... | F28F 9/002 165/67 |
| 2008/0202735 A1* | 8/2008 | Geskes | ................. | F28D 9/0006 165/166 |
| 2009/0260787 A1 | 10/2009 | Kalbacher | | |
| 2009/0272515 A1* | 11/2009 | Wu | ..................... | F02B 29/0462 165/140 |
| 2012/0006021 A1* | 1/2012 | Bausch | ................... | B23P 15/26 60/618 |
| 2012/0145366 A1* | 6/2012 | Daly | ..................... | F25J 1/0022 165/135 |
| 2012/0292002 A1 | 11/2012 | Saumweber et al. | | |

FOREIGN PATENT DOCUMENTS

| | | |
|---|---|---|
| CN | 102667094 A | 9/2012 |
| DE | 10 2006 005 362 A1 | 8/2007 |
| DE | 10 2006 019 024 A1 | 10/2007 |
| DE | 10 2009 010 039 A1 | 9/2010 |
| DE | 10 2011 077 154 A1 | 11/2012 |
| EP | 1 843 117 A1 | 10/2007 |
| EP | 1 348 924 B1 | 5/2009 |
| EP | 1 762 807 B1 | 12/2010 |
| FR | 2 936 043 A1 | 3/2010 |
| WO | WO 2011/045152 A2 | 4/2011 |

OTHER PUBLICATIONS

Chinese Office Action for Chinese Application No. 201380048219.2 dated Dec. 21, 2016 with partial English translation.

* cited by examiner

Fig. 1

HEAT EXCHANGER

This nonprovisional application is a continuation of International Application No. PCT/EP2013/066289, which was filed on Aug. 2, 2013, and which claims priority to German Patent Application No. 10 2012 216 589.4, which was filed in Germany on Sep. 17, 2012, and which are both herein incorporated by reference.

BACKGROUND OF THE INVENTION

Field of the Invention

The invention relates to a heat exchanger, particularly a charge air cooler or an exhaust gas cooler for a motor vehicle.

Description of the Background Art

An exhaust gas heat exchanger, which consists of a stack surrounded by a housing, is known from EP 1 348 924 B1, which corresponds to U.S. Pat. No. 6,920,918, whereby the stack is formed of flat tubes and each flat tube contains a turbulator, whereby the exhaust gas flows through each flat tube. A coolant channel, designed with flow directing elements through which the coolant taking up the heat of the exhaust gas is conducted, is formed in each case between two flat tubes.

To be able to better compensate rising exhaust gas temperatures, an exhaust gas heat exchanger is known from DE 10 2006 005 362, which corresponds to U.S. Pat. No. 8,020,610, in which the flow directing elements consist of a corrugated plate. Channels with inlets and outlets, which extend in the longitudinal or transverse direction of the exhaust gas heat exchanger, are formed in this plate. In both solutions, the exhaust gas channels are surrounded by a coolant-conducting housing, which has a substantial weight and contributes greatly to the cost during the production of the exhaust gas heat exchanger.

EP 1 762 807 B1, which corresponds to US 2007/0023174, discloses a heat exchanger with plate pairs each forming a fluid channel, whereby exhaust gas flows through the fluid channel. Individual channels which conduct the coolant are formed between the plate pairs, whereby the fluid channels conducting the exhaust gas delimit the heat exchanger outwardly and thus the hot fluid channels form the outer wall of the heat exchanger. To realize the coolant-conducting fluid channels laterally outward, embossings, which reduce the flow cross section of the exhaust gas-conducting fluid channel, are necessary in the exhaust gas-conducting wall regions of the fluid channel.

SUMMARY OF THE INVENTION

It is therefore an object of the present invention to provide a heat exchanger that has a high thermal capacity despite minimized material costs and weight.

An exemplary embodiment of the invention relates to a heat exchanger, particularly an exhaust gas cooler or charge air cooler, comprising a plate stack having a plurality of elongated plate pairs, whereby in each case two interconnected plates form a second fluid channel between them and a first fluid channel is formed between two plate pairs, whereby a first fluid channel is surrounded by two second fluid channels, whereby each second fluid channel is connected to at least one fluid collecting channel. It is achieved thereby that the second fluid channel delimits the plate stack outwardly and thus the channel conducting the second medium and having the lower temperatures delimits the plate stack outwardly.

In an embodiment, the interconnected two plates of a plate pair can form a U-shaped second fluid channel or a Z-shaped second fluid channel between them. Thus, a first fluid channel enclosed by second fluid channels can be created by stacking two plate pairs on top of one another.

In an embodiment, the U-shaped second fluid channel can be covered by a further second fluid channel such that a first fluid channel is located between the two second fluid channels.

In an embodiment, the first fluid channel can be enclosed on four sides by the second fluid channel.

In an embodiment, a wall of the second fluid channel can delimit the heat exchanger outwardly.

In an embodiment, the two interconnected plates of a plate pair can be soldered or welded on both sides at their rims along their longitudinal extension and/or transverse extension.

In an embodiment, a rim, that can be formed perpendicular on the bottom plate and/or on the top plate, is soldered to a base of the overlying bottom plate.

In an embodiment, at least one opening for connecting the second fluid channel to the coolant collecting channel can be formed in at least one of the shaped rims.

In an embodiment, the header can extend to thereby cover the plate stack approximately perpendicularly, and can have a recess for exchanging the second fluid, such as a coolant, preferably opposite to the openings of the plate stack.

In an embodiment, the header can be formed as a tube segment. A simple fabrication can be achieved thereby.

In an embodiment, the header can encompass the plate stack at least partially as a tensioning clamp.

In an embodiment, one opening each can be formed in the rim of the plate near an inlet and outlet for the first fluid, whereby the inlet and outlet for the first fluid are formed by the narrow sides of the two interconnected plates and the openings of a plurality of interconnected plate pairs, arranged lying on top of one another, lie approximately one above the other.

In an embodiment, a rimless or rimmed cover plate can be provided for closing the topmost second fluid channel. In this case, it can be advantageous further if a rimless or rimmed base plate is used for closing the lowermost second fluid channel.

In an embodiment, the coolant collecting channel can be formed as a header. As a result, in an exemplary embodiment an additional pipe for the coolant can be omitted completely or at least partially.

In an embodiment, the header can extend covering the plate stack approximately perpendicularly and has a recess for exchanging the second fluid, such as a coolant, preferably opposite to the openings of the plate stack.

In an embodiment, the header can be formed as a tube segment.

In an embodiment, the header can encompass the plate stack at least partially as a tensioning clamp. As a result, the header has a further effect for holding together the plate stack.

In an embodiment, the coolant collecting channel can be formed as a coolant tank.

In an embodiment, each second fluid channel can be connected to the coolant tank, whereby the coolant tank has an outer connection for a connector, for example a tube, for supplying the coolant to the coolant tank or for discharging the coolant from the coolant tank. This has the advantage that the connector can be soldered concurrently and the fabrication cost is reduced thereby. The use of a tube as a connector is furthermore cost-effective and can be formed very flexible.

In an embodiment, the coolant tank can be formed as a one-piece diffuser. This has the advantage that a precise shaping is made possible, because there are no or only minor distortions of an additional joining process, particularly no welding distortions.

In an embodiment, the coolant collecting channel can be shaped as a flange, which is formed from a metal sheet, at least partially encompassing the plate stack, or a cast part or a plastic part and has a sealing surface for connection to the connector. This has the advantage that the flange can be mounted directly at an opening, for example, in the coolant collecting strip, without additional tubing being necessary, which can signify a cost reduction and a simple assembly.

In an embodiment, the heat exchanger can be fabricated at least partially from an austenitic and/or ferritic material. An austenitic material has the advantage of excellent corrosion resistance and formability and a ferritic material has the advantage that it is economical and the price/performance ratio is very good. It has better heat conduction and thereby an increased cooling performance, and a lower thermal expansion and thereby lower thermal stress.

It is also expedient, if all structural parts of the heat exchanger can be soldered in a single pass through the furnace. This brings about a high dimensional stability due to the minor distortions and forms the basis for a cost-effective fabrication.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
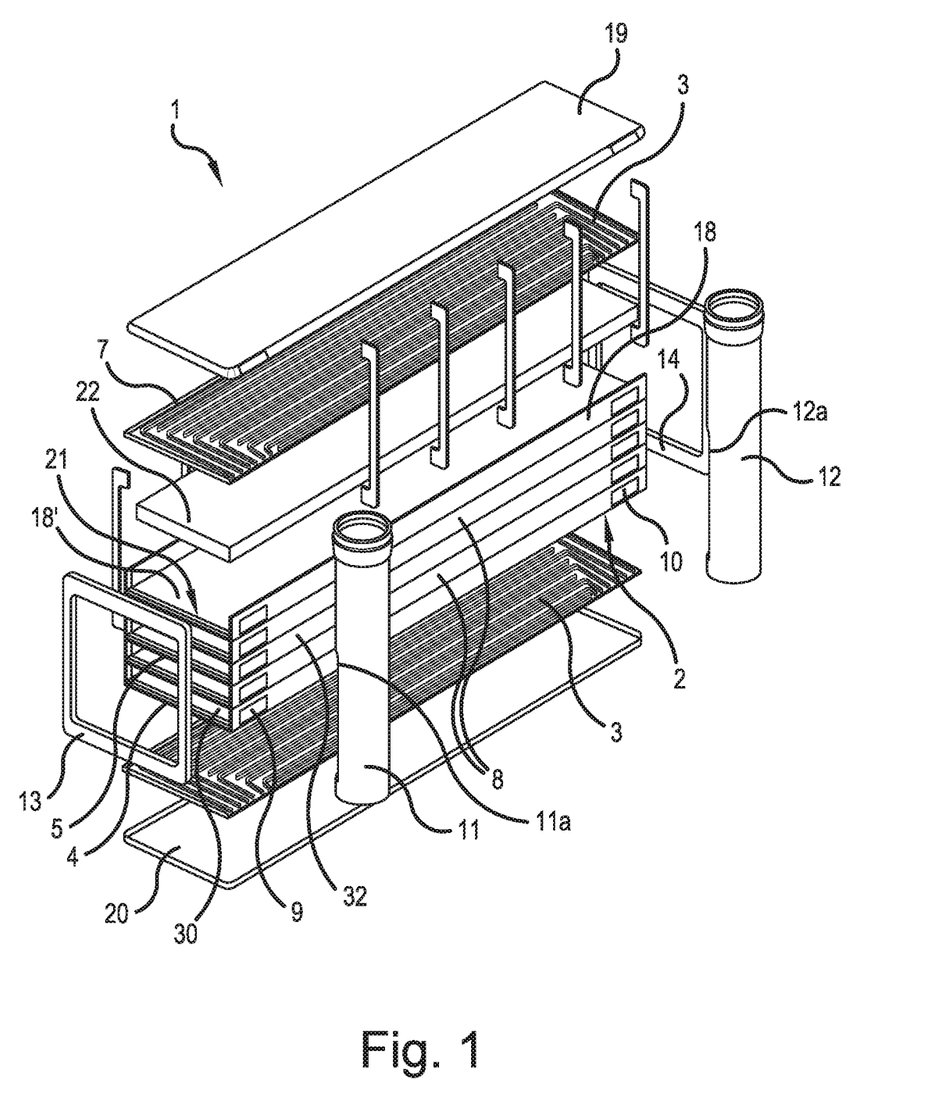
FIG. 1 shows an exemplary embodiment of a heat exchanger of the invention.

FIG. 1 shows an exemplary embodiment of a heat exchanger 1 of the invention, which can be formed as an exhaust gas cooler or as a charge air cooler. Alternatively, heat exchanger 1 can also be used in another way. It is advantageous if a gaseous fluid is used as a first fluid. In this case, exhaust gas or air, such as charge air, can be used as the first gaseous fluid. It is also advantageous if a liquid fluid is used as the second fluid. Water or a water-based mixture used as a coolant or another coolant or a refrigerant can be employed for this purpose.

Such a heat exchanger 1 can be used advantageously as an exhaust gas heat exchanger in a motor vehicle. Within the scope of a so-called exhaust gas recirculation system (EGR system), the exhaust gas discharged from the internal combustion engine of the motor vehicle can be cooled at least partially by a liquid coolant of a coolant circuit in the heat exchanger and be again supplied to the intake tract of the internal combustion engine. Such a heat exchanger 1 can likewise be used advantageously as a charge air cooler in a motor vehicle. In this case, the charge air is cooled by the coolant.

Heat exchanger 1 includes a stack 2 of elongated plate pairs 32, whereby in each case two plates 18, 18', lying one above the other, are soldered together along their longitudinal extension at their rim in the longitudinal direction.

If plate pairs 32, formed from plates 18, 18', are stacked one on top of the other, a first fluid channel 30 thus forms between the respective plate pairs 32. In this regard, first fluid channel 30 is formed between a top plate 18' of a bottom plate pair 32 and bottom plate 18 of a top plate pair 32. In this regard, a second fluid channel 4 is formed between the two plates 18, 18' of a plate pair 32. First fluid channel 30 is used for the throughflow of the gaseous first fluid, whereby second fluid channel 4 is used for the throughflow of the liquid second fluid.

The plate composite of the two plates 18, 18' is made open on narrow side 21, as a result which an inlet 5 or outlet 6 is formed for the first fluid of the first fluid channel. In this regard, the two plates are connected on the narrow sides such that the second fluid channel between the two plates 18, 18' is closed by an embossing, folding, and/or soldering.

The plate pair of plates 18, 18' has an approximately U-shaped contour with a rectangle-like exterior form, whereby plates 18, 18' are connected together at two longitudinal rims and/or at two longitudinal sides, e.g., are soldered, whereby the plates in the soldered state are formed spaced apart from one another in a central region.

A coolant conducting arrangement 3, formed flat or lying on the base of bottom plate 18, can be integrated into the interior of each plate pair 32 of plates 18, 18'. Alternatively, this can also be omitted. Said coolant conducting arrangement 3 can thereby be embossed as an embossing or embossings in base 60 of plate 18 and/or in base 61 of plate 18', so that the fluid flowing through fluid channel 4 formed in the interior of plate pair 18, 18' experiences being guided and optionally a channeling. To this end, for example, web-shaped embossings are provided, which project into second fluid channel 4 between the two plates 18, 18'. Alternatively, coolant conducting arrangement 3 can also be disposed between plates 18, 18' as a separate part with embossings or structures. Base 60, 61 of plate 18 or 18' is thereby defined as the substantially planar or flat region between optionally present upright rims of a plate 18, 18'.

First fluid channel 30 is arranged between a plate 18', placed at the top, of the one plate pair 32 and a plate 18, adjacent thereto, of a further adjacent plate pair 32. For example, exhaust gas or charge air flows as the first fluid through said fluid channel 30. Second fluid channel 4 in this case is arranged between the two plates 18, 18' of a plate pair 32. For example, a liquid coolant flows through said fluid channel 4.

The first fluid is supplied to first fluid channels 30, therefore, for example, exhaust gas, via inlet 5 of plate stack 2, which is formed by an open end of narrow side section 21 of plate pairs 32 of plates 18, 18'. The first fluid flows through first fluid channel 30 and leaves plate stack 2 of plate pairs 32 with plates 18, 18' via outlet 6, which is formed opposite to inlet 5.

An alternative exemplary embodiment can also provide a U-flow through plate stack 32, so that outlet 6 and inlet 5 are arranged on the same side of plate stack 2 and a redirection is provided at the end of plate pairs 32 with plates 18, 18', said end being opposite to said inlets and outlets 5, 6.

Coolant channel arrangement 3 has a plurality of coolant-conducting webs 7, which run parallel to one another in the longitudinal direction of plates 18, and form the individual subchannels, whose open ends, close to inlet 5 or outlet 6 of the first fluid, are made running in a direction perpendicular to inlet 5 or outlet 6. Said webs guide the subchannels arranged therebetween to the inlet or outlet for the second fluid, provided as openings 9, 10 in the side walls or rims 8 of plate 18.

Figures 2A, 2B, 2C, 2D, 2E:
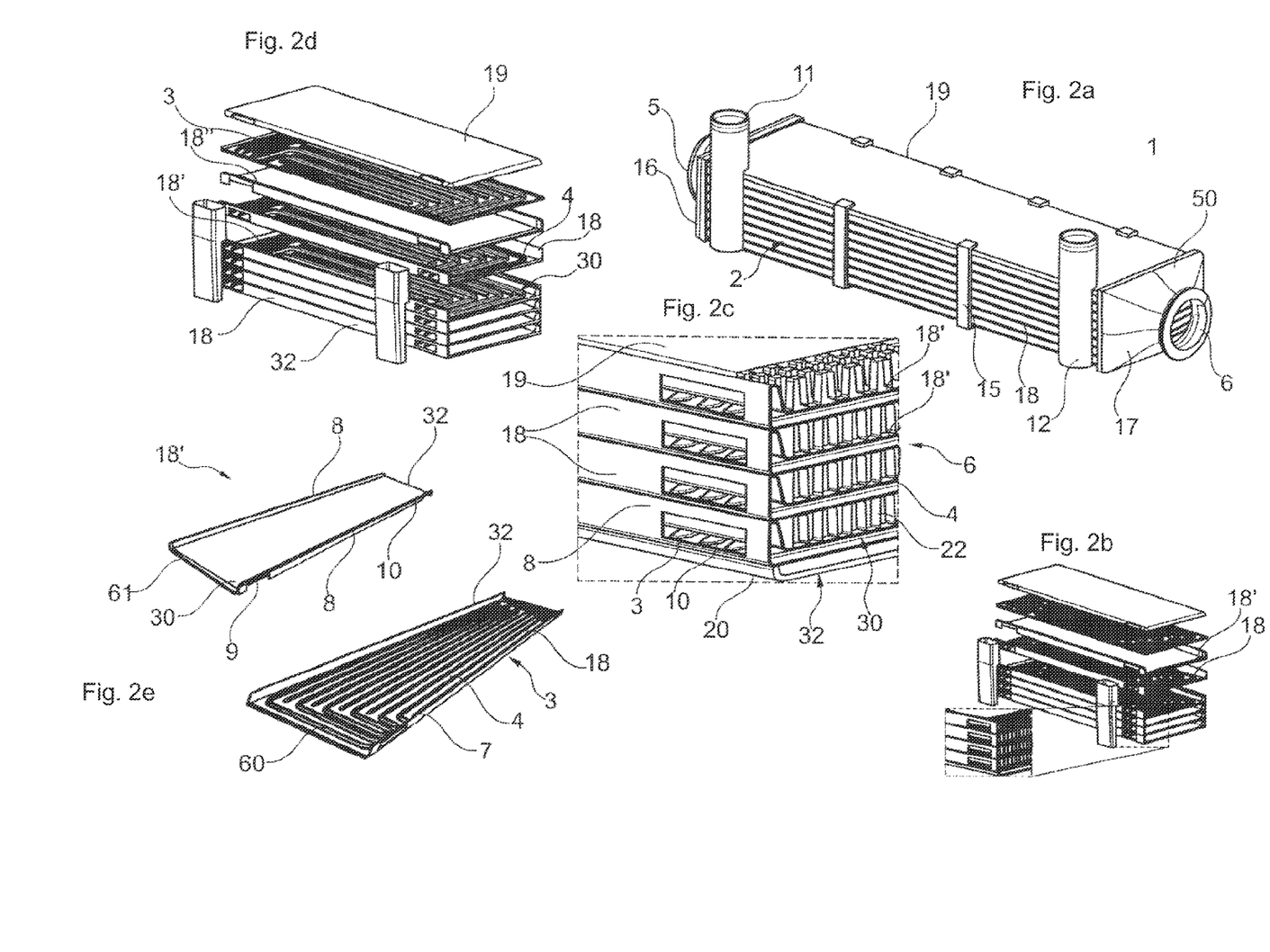
FIGS. 2a to 2e show a detailed illustration of the exemplary embodiment of the heat exchanger of the invention.

Each plate 18 in its longitudinal extension has on both sides an upwardly bent rim 8 in the form of a fold, which extends perpendicular in the direction of the overlying, identically formed adjacent plate 18; see FIG. 2c on this point.

Plate 18' likewise has an upright rim 40 on both sides, which is upwardly bent in the manner of a fold, whereby the rim is again bent downward outwardly to the side. As a result, rim 40 is formed virtually double-layered, whereby a space is provided between the two layers 41, 42. Plate 18' lies on plate 18 and rims 40 lie between rims 8. In so doing, advantageously the outer walls of rims 40 or 8 are in contact, therefore layer 41 with rim 8.

Depending on the required cooling performance, a plurality of such connected plate pairs 32 with plates 18, 18' can be stacked one above the other as plate stack 2.

An opening 9 or 10 in each case in the longitudinal direction of plate pairs 32 is incorporated into the end region of the merged ends of plates 18, 18' in rim 8 of plate 18. Said openings 9, 10 are used for the outlet or inlet for the second fluid, such as the coolant. The openings of the particular plate pairs are arranged lying one above the other in plate stack 2. Openings 9 or 10, lying one above the other, of a plurality of plate pairs 32 of plates 18, 18' are completely covered by a coolant collecting channel 11, 12 and fluidically connected. In this regard, the particular coolant collecting channel 11, 12 can have a recess 11a, 12a, which sealingly covers openings 9 or 10. In this case, coolant collecting channel 11, 12 is advantageously made as a deep-drawn part or a tube segment and is pushed over openings 9 or 10 of plates 18.

Plate stack 2 is gripped by a frame 13, 14 on narrow side 21. Plates 18 are shaped furthermore on narrow sides 21 of plate stack 2 so that without or optionally together with frame 13, 14 a continuous circumferential contour arises, over which a diffuser 50, a flange, or an adapter can be pushed and soldered leak-free. As an alternative to the configuration of frames 13, 14, these can also be formed with a hole pattern corresponding to the spaced apart fluid channels.

It is advantageous, further, if on at least one or both frames a connection is provided for carrying the gas and/or tensionor for fixation after the joining.

Heat exchanger 1 ends on the top side with a rimless or rimmed cover plate 19 (i.e., a top cover plate). Said cover plate 19 can lie on rim 8 or between the rims of the topmost plate 18 or both plates 18, 18'. Topmost fluid channel 30, particularly as a coolant channel, is closed via the cover plate 19, without additional structural elements being necessary.

On the bottom side, a likewise rimless base plate 20 (i.e., a bottom cover plate) is used to stabilize the last bottom plate 18.

Second fluid channel 4 is formed, for example, U-shaped between the two plates 18, 18'. In this regard, fluid channel 4 occupies a first subregion 53, which is formed virtually planar and runs substantially parallel to base 60 of plate 18. Further, fluid channel 30 occupies two lateral subregions 51, 52, which are oriented substantially perpendicular to the plane of base 60 of plate 18. Subregions 51, 52 are thereby configured so that fluid channel 30 is positioned higher at the rims than in middle subregion 53 of base 60 of plate 18.

If a further identical plate pair 32 is placed on this plate pair 32, configured in such a way, bottom plate 18 of top plate pair 32 thus closes first fluid channel 30 between the bottom and top plate pair 32 by lying on rims 8 of bottom plates 18 and/or top plate 18' of bottom plate pair 32.

FIG. 2 shows details of heat exchanger 1, as it is illustrated in FIG. 1. An assembled heat exchanger 1 of the invention, in which plate stack 2 is held by clamps 15 running perpendicular to plates 18, 18', is shown in FIG. 2a. A diffuser as a collector 16, 17 is placed on each inlet 5 and outlet 6 for the first fluid such as, for example, an exhaust gas or charge air, whereby two headers 11 or 12 for the second fluid such as, for example, a coolant, are arranged on the same side of plate stack 2 near a collector 16, 17. As an alternative, both headers 11, 12 can also be arranged on opposite side surfaces of the plate stack. This would mean that one header 11, 12 is arranged to the right of plate stack 2 in the flow direction of the first fluid and one of headers 12, 11 to the left of plate stack 2 from the perspective of the flow direction of the first fluid.

FIGS. 2b and 2c show a detail of heat exchanger 1, particularly in the area of outlet 6 for the first fluid. To explain the structure of the heat exchanger, turbulators 22 are shown arranged in fluid channel 4. Turbulators 22, also called fins or corrugated fins, are positioned on plate 18' and are covered by overlying plate 18, which sits on rims 8, formed perpendicular from underlying plate 18 and/or from plate 18', and is soldered to it.

Openings 10 are arranged in rim 8 along the longitudinal extension of rims 8, whereby openings 10 take on approximately the height of rim 8. In this case, the openings are arranged upwardly offset removed by the width of a web from the base of plate 18. A web is also arranged above the opening up to the top edge of rim 8, so that the opening is delimited by a web upwardly and downward and is likewise delimited by the material of rim 8 to the side from the perspective in the direction of flow of the first fluid.

In FIG. 2c, joined plates 18 and 18' can be seen, which form the second fluid channel in a U-shape between them.

Coolant collecting channel 12 extending over openings 10, apart from the function of coolant conduction, can also be used as a tensioning clamp as a replacement for the soldering device or for a weight support during soldering. Other functions, such as the attachment of pipes in the engine periphery or hold points for the radiator, can also be integrated in coolant collecting channel 12; see FIG. 2d.

In proposed heat exchanger 1, second fluid channels 30, particularly as coolant channels, are formed alternately to first fluid channels 4, particularly as exhaust gas channels. Second fluid channels 30 in this case are formed U-shaped in section and enclose first fluid channels 4 on three sides, so that first fluid channels 4 can be cooled from three sides by the fluid of the second fluid channel. Further, the second fluid channel of the overlying plate pair delimits the first fluid channel, so that the adjacent second fluid channel delimits the fourth side of the first fluid channel and the fluid flowing through it cools the first fluid channel. Plates 18, 18' are configured so that a longitudinal soldering occurs either at a largely lateral soldering seam or vertically on the already explained internally formed rim 8 of plates 18, 18'.

In contrast to the prior art, rim 8 protrudes substantially perpendicular to the base of plates 18, 18' of the plate pair and thus allows the second fluid channel, particularly for the coolant, to be delimited outwardly, so that the outer wall of the heat exchanger is in contact with the second fluid, particularly the coolant. The outer wall thus can be formed cooled, which is of great advantage for the surrounding area of the heat exchanger, because the surrounding area does not become as hot as the first fluid. Furthermore, a smooth lateral surface on plate stack 2 is formed by the lateral contour of rim 8, so that, firstly, the headers can be attached and sealed well and the plate stack can be enclosed well and thereby braced. Good leak tightness during soldering is achieved thereby.

Figures 3A, 3B, 4A, 4B:
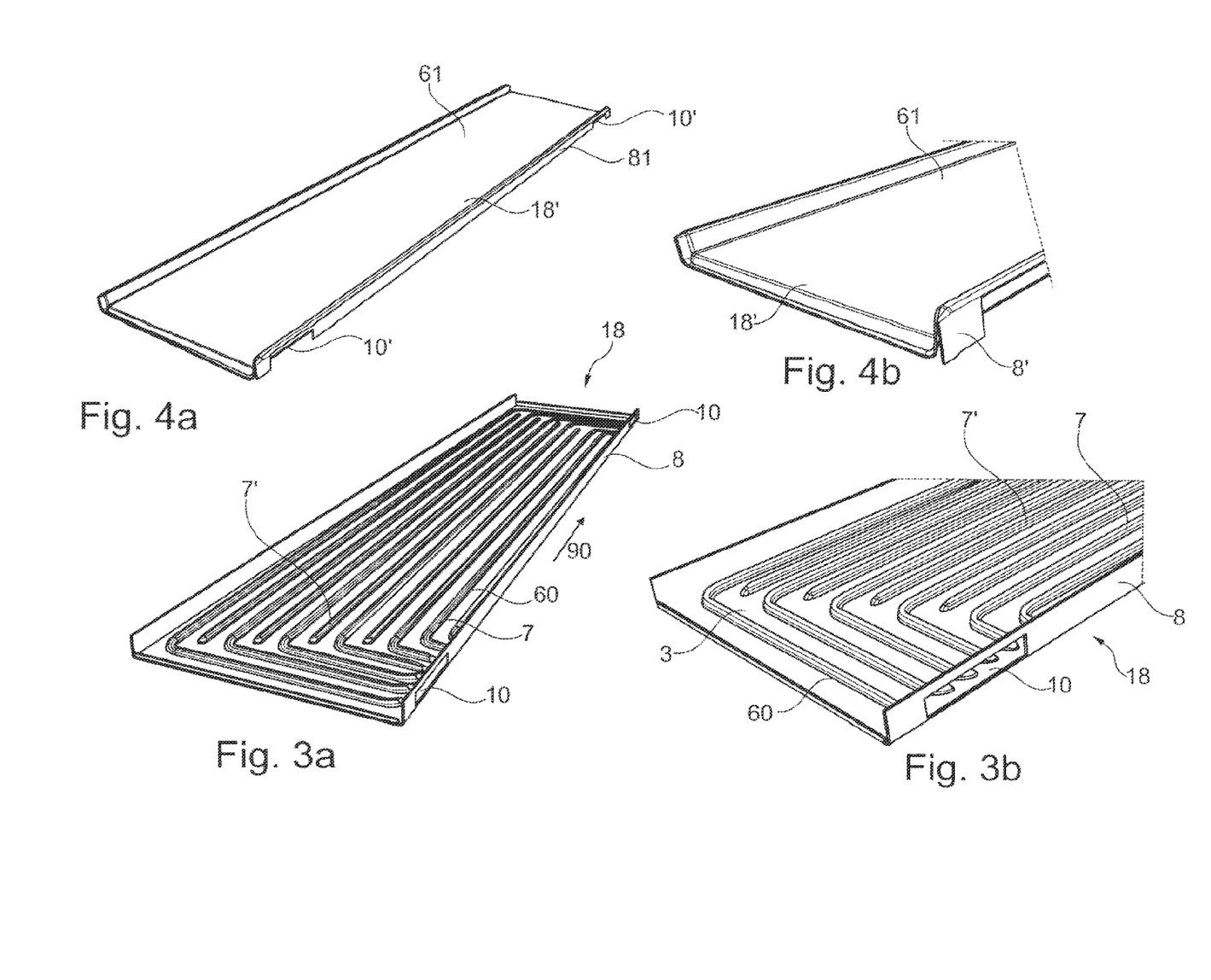
FIG. 3a shows a perspective view of a first, bottom plate of a plate pair.
FIG. 3b shows an enlarged perspective view of a first, bottom plate of a plate pair.
FIG. 4a shows a perspective view of a second, top plate of a plate pair.
FIG. 4b shows an enlarged perspective view of a second, top plate of a plate pair.

FIGS. 3a and 3b show a bottom plate 18 of the plate pair. In this regard, the plate has an approximately rectangular elongated contour. A rim 8, which protrudes approximately at a right angle from the base or from the plane of base 60, is bent upwardly at the two opposite lateral sides of plate 18. Openings 10 are introduced in a rim 8 at the ends or adjacent to the ends of the plate for the inflow or outflow of a fluid. Openings 10 are made substantially rectangular.

Webs 7, which are used to create subchannels and form a flow path between openings 10, are embossed in base 60 as a coolant conducting arrangement 3. In this regard, individual webs 7 or webs 7 are formed such that they have a rectangular course from the one opening 10 to the other opening 10. In a first section, they run perpendicular to main orientation 90 of plate 18, in a middle section they run parallel to main orientation 90 of plate 18, and in a further section they again run perpendicular to main orientation 90 of plate 18.

Second webs 7', which only have an orientation parallel to main orientation 90, can also be arranged between webs 7 formed in such a way.

FIGS. 4a and 4b show a top plate 18' of the plate pair. In this regard, plate 18' has an approximately rectangular elongated contour. A rim 8', which protrudes approximately at a right angle from the base or from the plane of base 61, is bent upwardly at the two opposite lateral sides of plate 18'. In this case, rim 8' is made double-walled. Openings 10' are introduced in the outer rim sheet of rim 8' at the ends or adjacent to the ends of plate 18' for the inflow or outflow of a fluid. Openings 10' are made substantially rectangular.

Base 61 is formed planar or it can have webs, extending downward into the second fluid channel, or other embossings.

On the front and back end region of plate 18', the base and the rims are shaped such that a sealed end region forms when plate 18' is placed on plate 18.

If plate 18' is placed on plate 18, second fluid channel 4 thus arises between the two plates 18, 18'. The two plates 18, 18' are connected sealed to one another except for openings 10.

Figure 5:
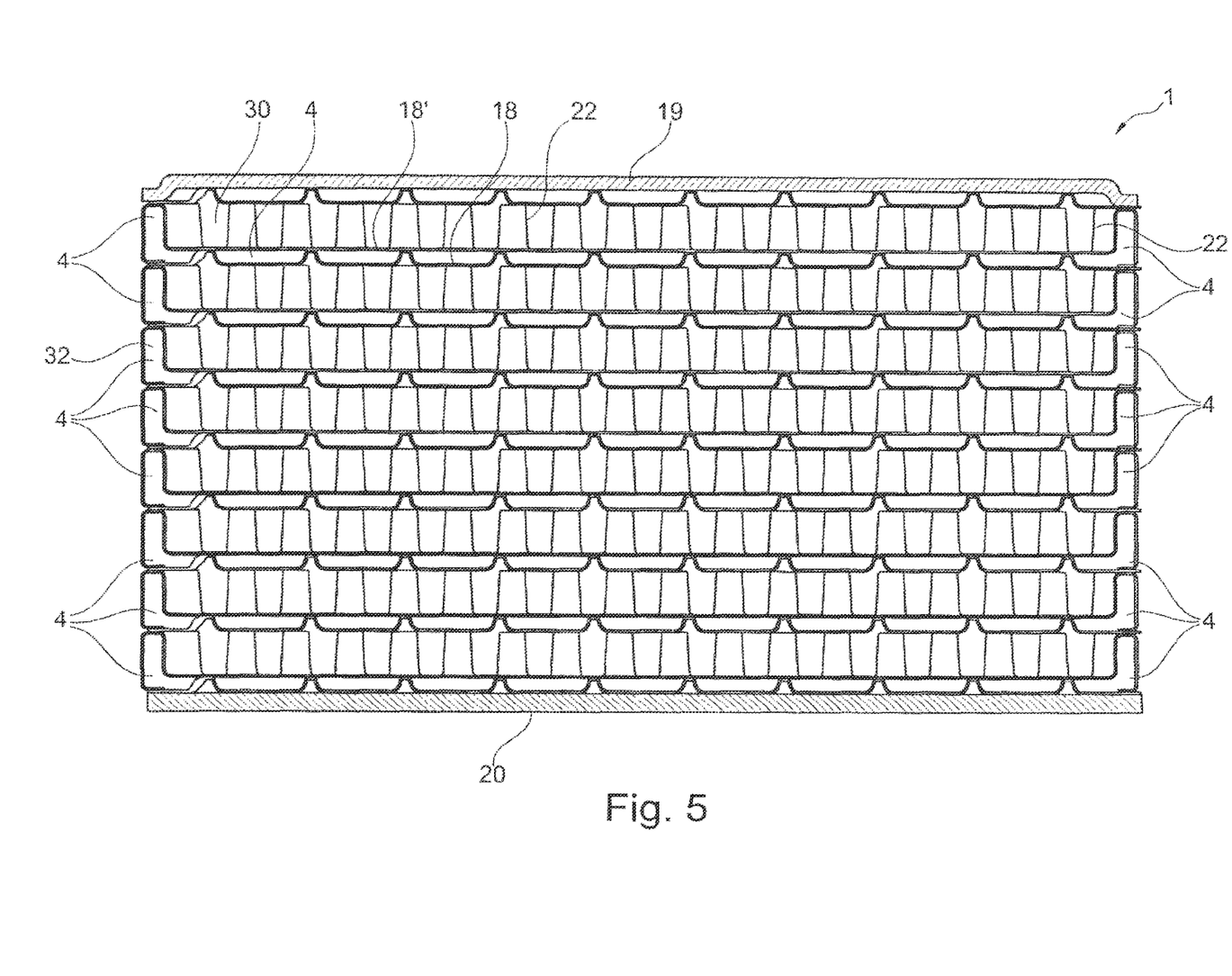
FIG. 5 shows a view of a section through the heat exchanger.

FIG. 5 shows a section through heat exchanger 1, which is formed by the stacking of plate pairs 32 on top of one another. In this case, the plate pairs are formed by plates 18 and 18'. Fluid channel 4 is formed between a bottom plate 18 and a top plate 18', particularly for the throughflow of a coolant. First fluid channel 30 is arranged between a top plate 18' of a plate pair 32 and bottom plate 18 of an adjacent plate pair.

A turbulence insert 22 can be provided in first fluid channel 30.

It is evident in FIG. 5 that second fluid channel 4 surrounds first fluid channel 30. Second fluid channels 4, which delimit the stack outwardly, are arranged on the sides of stack 2.

Figures 6A, 6B:
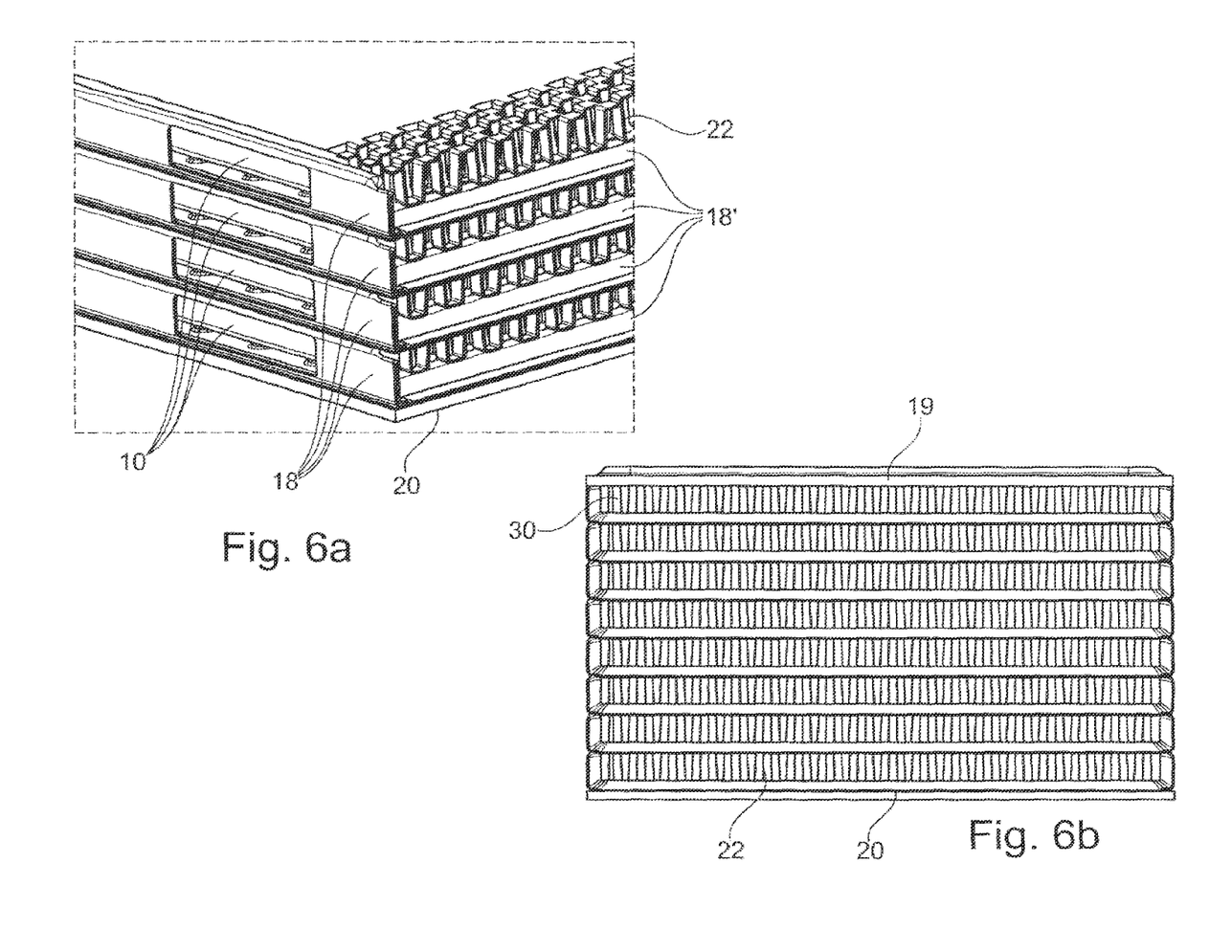
FIG. 6a shows a perspective view of an end region of the plate stack of the heat exchanger.
FIG. 6b shows a view of the plate stack of the heat exchanger.

FIGS. 6a and 6b show an end region of stack 2 of plate pairs 32. In this case, only first fluid channels 30 can be seen, because the second fluid channels are closed by the folding or embossing of plates 18' in the end region thereof.

FIGS. 7a to 7f show variations of plate pairs 32 in a sectional view.

Figures 7A, 7B, 7C, 7D, 7E:
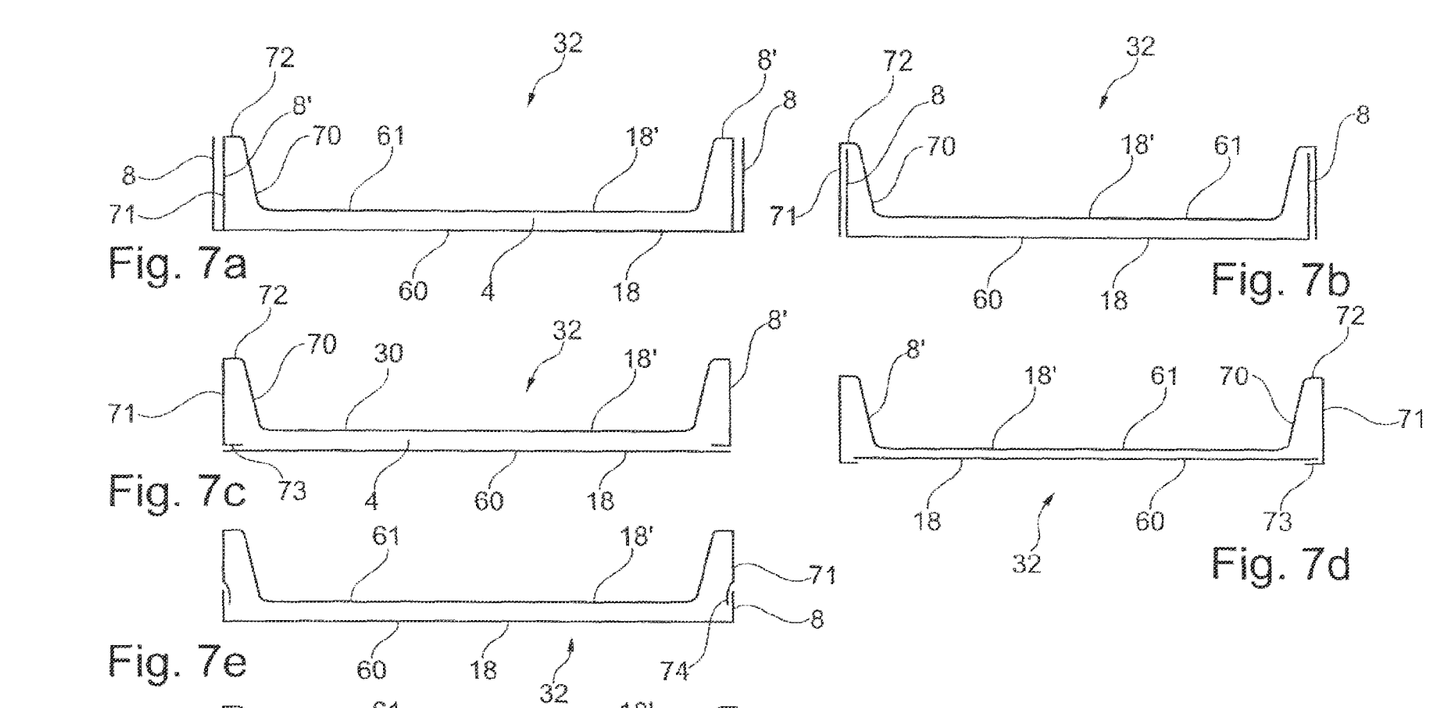
FIG. 7a shows a section through an exemplary embodiment of a plate pair.
FIG. 7b shows a section through a further exemplary embodiment of a plate pair.
FIG. 7c shows a section through a further exemplary embodiment of a plate pair.
FIG. 7d shows a section through a further exemplary embodiment of a plate pair.
FIG. 7e shows a section through a further exemplary embodiment of a plate pair.

FIG. 7a shows a section through a plate pair 32 according to the preceding figures. Plate 18 as the bottom plate of plate pair 32 is formed substantially U-shaped with a planar base 60 and rims 8 protruding approximately at right angles thereto. Plate 18' is likewise formed approximately U-shaped with a planar base 61 and upright rims 8'. In this case, rims 8' are made double-walled with an inner wall region 70 and an outer wall region 71 and a top connecting wall 72. Outer wall region 71 is inwardly adjacent to rim 8 of plate 18, whereby rims 8' are arranged between rims 8. Second fluid channel 4 is formed between the two plates 18, 18'. The first fluid channel is formed above base 61 and between opposite rims 8', when two plate pairs lie one on top of another.

FIG. 7b shows a section through an alternative plate pair. Plate 18 as the bottom plate of plate pair 32 is formed substantially U-shaped with a planar base 60 and rims 8 protruding approximately at right angles thereto. Plate 18' is likewise formed approximately U-shaped with a planar base 61 and upright rims 8'. In this case, rims 8' are made double-walled with an inner wall region 70 and an outer wall region 71 and a top connecting wall 72. Outer wall region 71 is outwardly adjacent to rim 8 of plate 18. Rim 8' partially overlaps rim 8 in this case. Second fluid channel 4 is formed between the two plates 18, 18'. The first fluid channel is formed above base 61 and between opposite rims 8', when two plate pairs lie one on top of another.

FIG. 7c shows a section through a further alternative plate pair 32. Plate 18 as the bottom plate of plate pair 32 is formed substantially flush with a planar base 60. Plate 18' is formed approximately U-shaped with a planar base 61 and upright rims 8'. In this case, rims 8' are made double-walled with an inner wall region 70 and an outer wall region 71 and a top connecting wall 72. The outer wall has at the bottom an inwardly pointing further wall region 73, which lies on planar base 60 of plate 18. Second fluid channel 4 is formed between the two plates 18, 18'. The first fluid channel is formed above base 61 and between opposite rims 8', when two plate pairs lie one on top of another.

FIG. 7d shows a section through a further alternative plate pair 32. Plate 18 as the bottom plate of plate pair 32 is formed substantially flat with a planar base 60. Plate 18' is formed approximately U-shaped with a planar base 61 and upright rims 8'. In this case, rims 8' are made double-walled with an inner wall region 70 and an outer wall region 71 and a top connecting wall 72. The outer wall has at the bottom an inwardly pointing further wall region 73, which reaches under planar base 60 of plate 18 and is adjacent to it from below. Second fluid channel 4 is formed between the two plates 18, 18'. The first fluid channel is formed above base 61 and between opposite rims 8', when two plate pairs lie one on top of another.

FIG. 7e shows a section through a further alternative plate pair 32. Plate 18 as the bottom plate of plate pair 32 is formed substantially U-shaped with a planar base 60 and rims 8 protruding approximately at right angles thereto. Plate 18' is likewise formed approximately U-shaped with a planar base 61 and upright rims 8'. In this case, rims 8' are made double-walled with an inner wall region 70 and an outer wall region 71 and a top connecting wall 72. Outer wall region 71 at its bottom region has a bent-off section 74 which is inwardly adjacent to rim 8 of plate 18. Second fluid channel 4 is formed between the two plates 18, 18'. The first fluid channel is formed above base 61 and between opposite rims 8', when two plate pairs lie one on top of another.

Figure 7F:
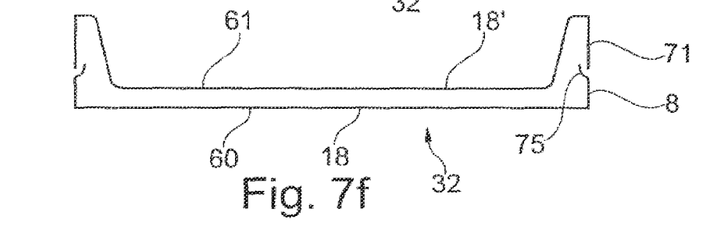
FIG. 7f shows a section through a further exemplary embodiment of a plate pair.

FIG. 7f shows a section through a further alternative plate pair 32. Plate 18 as the bottom plate of plate pair 32 is formed substantially U-shaped with a planar base 60 and rims 8 protruding approximately at right angles thereto. Plate 18' is likewise formed approximately U-shaped with a planar base 61 and upright rims 8'. In this case, rims 8' are made double-walled with an inner wall region 70 and an outer wall region 71 and a top connecting wall 72. Rim 8 at its top region has a bent-off section 75, which is inwardly adjacent to wall region 71 of plate 18'. Second fluid channel 4 is formed between the two plates 18, 18'. The first fluid channel is formed above base 61 and between opposite rims 8', when two plate pairs lie one on top of another.

Special designs of exhaust gas heat exchanger 1 of the invention will be described below, which are not shown in greater detail in the drawings. An I-flow, therefore a linear throughflow, for two coolant circuits will be considered first. In this case, the plates have in addition two side inlets or outlets before or after a partitioning of a coolant channel between the front and back part of the coolant channel. This type of design is especially suitable for applications with a high-temperature and low-temperature coolant circuit. The partitioning of the coolant channel can occur in a completely sealing manner or with a small leakage amount between the high-temperature and low-temperature coolant section being allowed. If required, more than two coolant circuits can also be formed analogously.

In the case of a U-flow, therefore with a redirected throughflow, instead of a diffuser a closed box is disposed at the redirection end, whereby on the inlet side for the first fluid, therefore the exhaust gas, the sealing of the flows occurs by the construction of a parting plane in the form of a metal sheet or a cast wall between the inlet and outlet for the first fluid in the area of the front edge of a fluid channel for the second fluid, whereby optionally small leakage amounts of the first fluid could be allowed. Alternatively, the flows in each exhaust gas channel can be separated by a continuous fin, for example, a smooth fin, a corrugated or dimpled fin without cut webs, or by a partition plate inserted in each plane in the web fin. The sealing between the two flows then occurs directly on the fin, whereby the parting plane must accommodate the fins or the plate contour of the plate stack. A partition plate inserted in the fin in this case can also accommodate the plate contour, so that the parting plane between the inlet and outlet of the exhaust gas can be designed simpler in geometric terms.

A U-flow with two coolant circuits is achieved when the mounted coolant header tanks contain a partition wall that divides the coolant header tanks into two segments each at the particular end. The supplying or discharging of the coolant from the one or other circuit occurs in one segment. Alternatively, the two coolant header tanks can be placed one above the other. Further, the slitting of the coolant channels can occur for the high-temperature circuit on the one side of the exhaust gas heat exchanger and for the low-temperature circuit on the respective other side of the exhaust gas heat exchanger. In sum, four coolant header tank are then needed for the entry and exiting of the two media. Finally, the options can be combined, because a combined tank with a partition wall is arranged at one end of the exhaust gas heat exchanger and at the other end separated coolant header tanks are arranged on the two sides of the exhaust gas heat exchanger. Here as well, more than two coolant circuits can be formed analogously if necessary.

In the design of two parallel coolant circuits, the coolant channel is separated longitudinally by corrugations into two or more flows sealingly or with a small leakage being allowed; a medium can be conducted through the corrugations in a U-shaped manner or in a meandering manner in a plurality of loops. The second flows in this case can also be operated with two different media, because a separate supply of the flows from one or the other side of the exhaust gas cooler is possible.

Based on the explained solution, a lower-weight and structurally simpler arrangement of the exhaust gas heat exchanger or of the charge air cooler, which has a high thermal capacity, is possible.

Figure 8A:
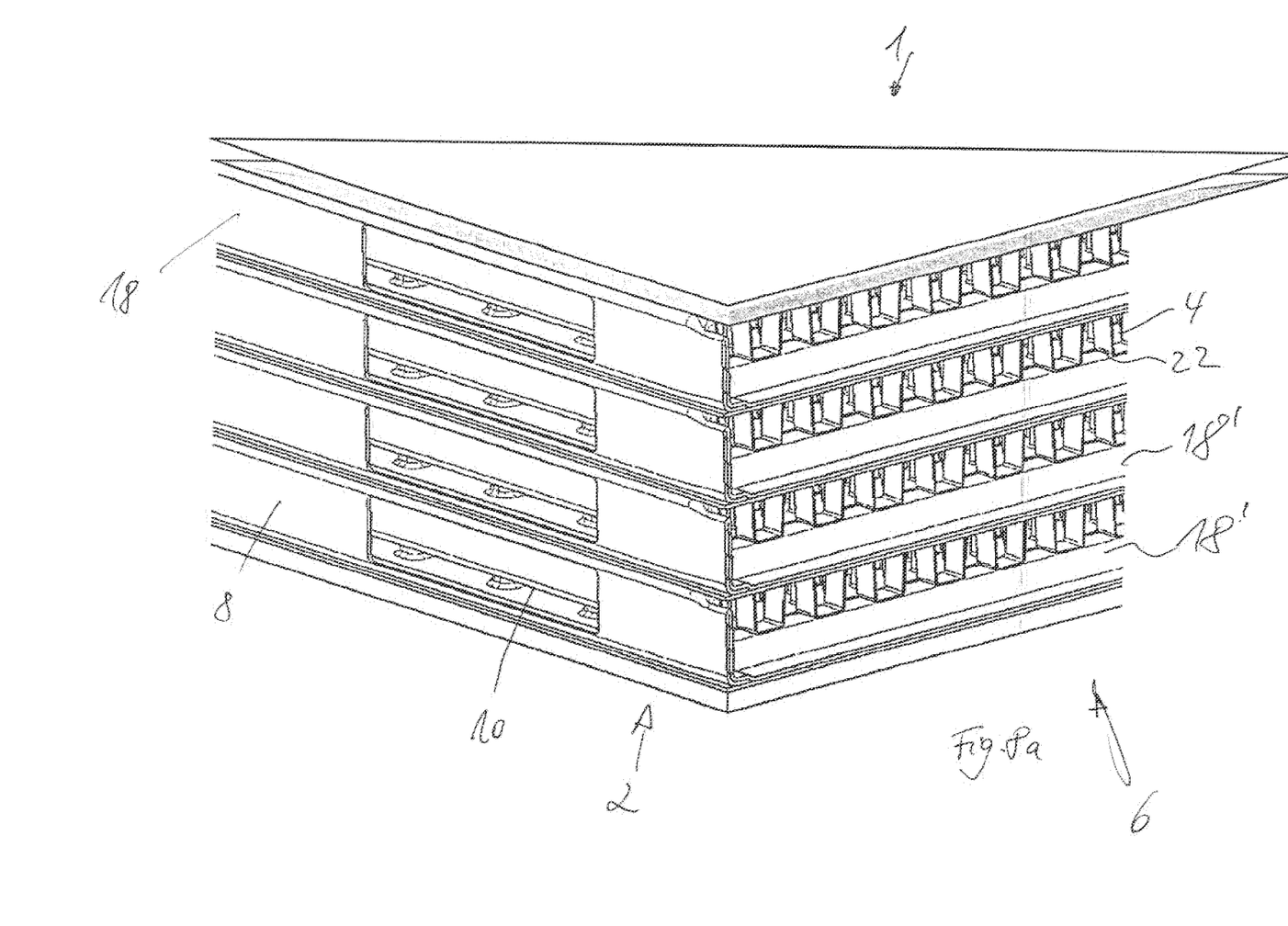
FIG. 8a shows a view of a plate stack.

FIG. 8a shows a detail of a heat exchanger 1. A heat exchanger 1 of the invention, in which plate stack 2 is constructed of plates 18, 18', is shown in FIG. 8a.

FIG. 8a shows a detail of heat exchanger 1, particularly in the area of outlet 6 for the first fluid. To explain the structure of the heat exchanger, turbulators 22 are shown arranged in fluid channel 4. Turbulators 22, also called fins or corrugated fins, are positioned on plate 18' and are covered by overlying plate 18, which sits on rims 8, formed perpendicular from underlying plate 18 and/or from plate 18', and is soldered to it.

Openings 10 are arranged in rim 8 along the longitudinal extension of rims 8, whereby openings 10 take on approximately the height of rim 8. In this case, the openings are arranged upwardly offset removed by the width of a web from the base of plate 18. A web is also arranged above the opening up to the top edge of rim 8, so that the opening is delimited by a web upwardly and downward and is likewise delimited by the material of rim 8 to the side from the perspective in the direction of flow of the first fluid.

Figure 8B:
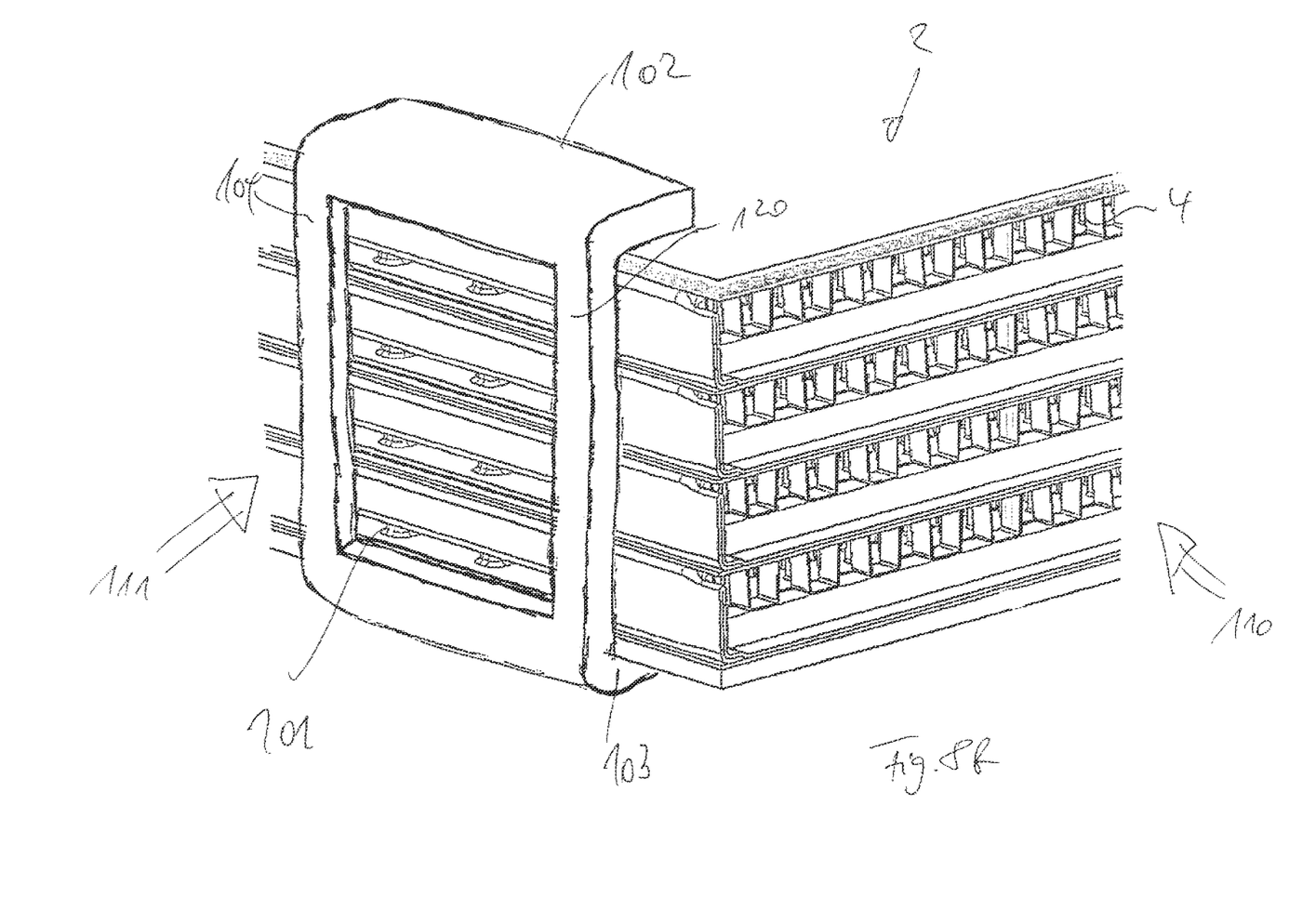
FIG. 8b shows a view of a plate stack with a connecting flange.

FIG. 8b shows plate stack 2, in which a bent metal sheet is provided as a connecting flange 100. The bent metal sheet 100 is formed as U-shaped sheet with a top and bottom end-side section 102, 103, whereby a middle section 104, which has window 101, is provided between these two end-side sections 102, 103. Said window 101 is arranged in such a way that it communicates with openings 10. Arrow 110 indicates the gas entry into fluid channels 4 and arrow 111 indicates the coolant entry or exit through window 101.

Window 101 is surrounded by a frame 120, which is preferably formed flat and is formed as a contact surface for a vehicle-side coolant connection and functions as a sealing surface.

The connecting flange can be made as a bent metal sheet part or alternatively also a cast part or the like.

It is advantageous, if there is a material connection between the diffuser and coolant tank on the gas inlet side. This brings about thermal relief.

It is also advantageous, if there is a material connection between the diffuser and radiator matrix, therefore fluid channels 4, on all sides with the exception of the coolant tank side.

It is also advantageous, if in the case of overlapping of walls the wall thickness of the materials and metal sheets can be reduced. In this regard, a wall metal sheet thickness from 0.2 mm to 0.5 mm, preferably 0.2 mm to 0.3 mm, can be provided.

The height of the coolant channel as a fluid channel is preferably less or equal to 2 mm.

The distance between corrugations 7, particularly in the fluid channel, is preferably less or equal to 3 mm to 15 mm, preferably 4 mm to 8 mm.

It is also advantageous, if the first and/or second fluid channel has a turbulence insert. A turbulence insert is used to increase performance and/or to increase strength and to serve as a support in the soldering process.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A heat exchanger comprising:
   a plate stack having a top cover plate, a bottom cover plate and a plurality of elongated plate pairs provided between the top cover plate and the bottom cover plate, wherein each elongated plate pair is formed of two interconnected plates that have a second fluid channel provided between the two interconnected plates; and
   a first fluid channel formed between two plate pairs, the first fluid channel being surrounded by two second fluid channels, each second fluid channel being connected to at least one coolant collecting channel,
   wherein each plate of the two interconnected plates of each elongated plate pair is formed of a base and a rim extending perpendicular from the base on each of the two longitudinal sides of the base, such that each plate has a base and two rims, and
   wherein at least one opening for connecting the second fluid channel to the coolant collecting channel is formed through at least one of the rims of at least one of the plates of the two interconnected plates of each elongated plate pair.

2. The heat exchanger according to claim 1, wherein the two interconnected plates of a plate pair form a U-shaped second fluid channel or a Z-shaped second fluid channel between them.

3. The heat exchanger according to claim 2, wherein the U-shaped second fluid channel is covered by a further second fluid channel such that a first fluid channel is located between the two second fluid channels.

4. The heat exchanger according to claim 1, wherein the first fluid channel is enclosed on four sides by the second fluid channel.

5. The heat exchanger according to claim 1, wherein a wall of the second fluid channel delimits the heat exchanger outwardly.

6. The heat exchanger according to claim 1, wherein the two interconnected plates of a plate pair are soldered or welded on both sides at their rims along their longitudinal extension or transverse extension.

7. The heat exchanger according to claim 1, wherein the rim of a bottom plate or of a top plate of the two interconnected plates is soldered to a base of a bottom plate of an overlying plate pair.

8. The heat exchanger according to claim 1, wherein the at least one opening for connecting the second fluid channel to the coolant collecting channel is near an inlet and an outlet for the first fluid, wherein the inlet and the outlet for the first fluid are formed by narrow sides of the two interconnected plates, and wherein the openings of a plurality of interconnected plate pairs, arranged lying on top of one another, lie approximately one above the other.

9. The heat exchanger according to claim 1, wherein the top cover plate is rimless or is rimmed cover plate and is provided for closing the topmost second fluid channel.

10. The heat exchanger according to claim 1, wherein the at least one coolant collecting channel is formed as a header.

11. The heat exchanger according to claim 10, wherein the header extends such that the header covers the plate stack approximately perpendicularly and has a recess for exchanging the second fluid or a coolant, opposite to the openings of the plate stack.

12. The heat exchanger according to claim 10, wherein the header is formed as a tube segment.

13. The heat exchanger according to claim 10, wherein the header encompasses the plate stack at least partially as a tensioning clamp.

14. The heat exchanger according to claim 1, wherein the at least one coolant collecting channel is formed as a coolant tank.

15. The heat exchanger according to claim 14, wherein each second fluid channel is connected to the coolant tank, and wherein the coolant tank has an outer connection for a connector for supplying the coolant to the coolant tank or for discharging the coolant from the coolant tank.

16. The heat exchanger according to claim 15, wherein the coolant tank is formed as a one-piece diffuser.

17. The heat exchanger according to claim 1, wherein the at least one coolant collecting channel is shaped as a flange, which is formed from a metal sheet, at least partially encompassing the plate stack, or a cast part or a plastic part and has a sealing surface for connection to the connector.

18. The heat exchanger according to claim 1, wherein the heat exchanger is fabricated at least partially of an austenitic and/or ferritic material.

19. The heat exchanger according to claim 1, wherein all structural parts of the heat exchanger are solderable in a single pass through the furnace.

20. The heat exchanger according to claim 1, wherein the heat exchanger is an exhaust gas cooler or charge air cooler.

21. The heat exchanger according to claim 1, wherein the two interconnected plates of a plate pair form a U-shaped second fluid channel in cross-section.

22. The heat exchanger according to claim 1, wherein the second fluid channel includes webs provided therein to direct fluid flowing through the second fluid channel and the first fluid channel includes corrugated fins provided therein.

23. The heat exchanger according to claim 1, wherein each of the two rims of a top plate of the two interconnected plates of each plate pair are double-walled.

\* \* \* \* \*

UNITED STATES PATENT AND TRADEMARK OFFICE
CERTIFICATE OF CORRECTION

| | |
|---|---|
| PATENT NO. | : 9,683,786 B2 |
| APPLICATION NO. | : 14/659816 |
| DATED | : June 20, 2017 |
| INVENTOR(S) | : Barwig et al. |

It is certified that error appears in the above-identified patent and that said Letters Patent is hereby corrected as shown below:

The following should be added to the Letters Patent:
Related U.S. Application Data
(63) Continuation of application No. PCT/EP2013/066289 filed on Aug. 2, 2013.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*